US006795414B1

(12) United States Patent
Sakamoto et al.

(10) Patent No.: US 6,795,414 B1
(45) Date of Patent: Sep. 21, 2004

(54) COMMUNICATION SYSTEM

(75) Inventors: Kenichi Sakamoto, Tokyo (JP);
Tsutomu Kusaki, Yokohama (JP);
Masaru Murakami, Yokohama (JP);
Takashi Yokoyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 31 days.

(21) Appl. No.: 09/906,677

(22) Filed: Jul. 18, 2001

Related U.S. Application Data

(63) Continuation of application No. 09/638,028, filed on Aug. 15, 2000, now Pat. No. 6,289,008, which is a continuation of application No. 09/411,655, filed on Oct. 4, 1999, now Pat. No. 6,178,165, which is a continuation of application No. 08/970,159, filed on Nov. 13, 1997, now Pat. No. 6,049,534.

(30) Foreign Application Priority Data

Nov. 14, 1996 (JP) .......................................... 08-302696

(51) Int. Cl.[7] .......................... H04Q 7/00; H04L 12/28
(52) U.S. Cl. ........................ 370/331; 370/390; 455/436
(58) Field of Search ................................. 370/331, 392, 370/389, 395.1, 442, 328, 390; 375/347, 299; 455/436, 517, 509, 507, 442, 443, 445

(56) References Cited

U.S. PATENT DOCUMENTS

| | | | |
|---|---|---|---|
| 4,887,265 A | 12/1989 | Felix | 370/94.1 |
| 4,947,452 A | 8/1990 | Hattori et al. | 455/437 |
| 5,095,531 A | 3/1992 | Ito | 455/437 |
| 5,159,596 A | 10/1992 | Itoh | 370/329 |
| 5,317,623 A | 5/1994 | Sakamoto et al. | 455/436 |
| 5,408,514 A | 4/1995 | Sakamoto et al. | 455/436 |
| 5,418,838 A | 5/1995 | Havermans et al. | 455/465 |
| 5,434,853 A | 7/1995 | Hemmady et al. | 370/60 |
| 5,457,680 A | 10/1995 | Kamm et al. | 370/17 |
| 5,487,065 A | 1/1996 | Acampora et al. | 370/60.1 |
| 5,539,923 A | 7/1996 | Matsumoto | 455/443 |
| 5,619,551 A * | 4/1997 | Yahagi | 379/60 |
| 5,675,642 A | 10/1997 | Sone | 370/389 |
| 5,691,985 A | 11/1997 | Lorenz et al. | 370/401 |
| 5,802,465 A | 9/1998 | Hamalainen et al. | 455/403 |
| 5,826,188 A | 10/1998 | Tayloe et al. | 455/436 |
| 5,870,675 A | 2/1999 | Tuutijarvi et al. | 455/436 |
| 5,884,173 A | 3/1999 | Sollner | 455/436 |
| 5,920,817 A | 7/1999 | Umeda et al. | 455/437 |
| 5,940,381 A | 8/1999 | Freeburg et al. | 370/331 |
| 6,023,461 A * | 2/2000 | Raychaudhuri et al. | 370/331 |
| 6,240,078 B1 * | 5/2001 | Kuhnel et al. | 370/331 |

FOREIGN PATENT DOCUMENTS

| | | |
|---|---|---|
| JP | 3094922 | 8/2000 |
| WO | 9532594 | 11/1995 |

OTHER PUBLICATIONS

M. Yokoyama, Mobile Communication Network, 112th Series of Information Network, Shokoudou.

* cited by examiner

*Primary Examiner*—Duc Ho
(74) *Attorney, Agent, or Firm*—Antonelli, Terry, Stout & Kraus, LLP

(57) ABSTRACT

A communication system includes a control unit, a switch and a diversity hand-over processing unit connected to the control unit and the switch for receiving both a first communication signal received from a radio base station which outputs the hand-over instruction, and a second communication signal received from another radio base station to which the communication signal will be hand-over so as to output one of the first and second communication signals to the associated interface circuit. The diversity hand-over processing unit transmits the communication signal received through the radio base station from the mobile station on the reception side for communication to both the interface circuit associated with the radio base station as a source of hand-over and the interface circuit associated with the radio base station as a destination of hand-over.

8 Claims, 8 Drawing Sheets

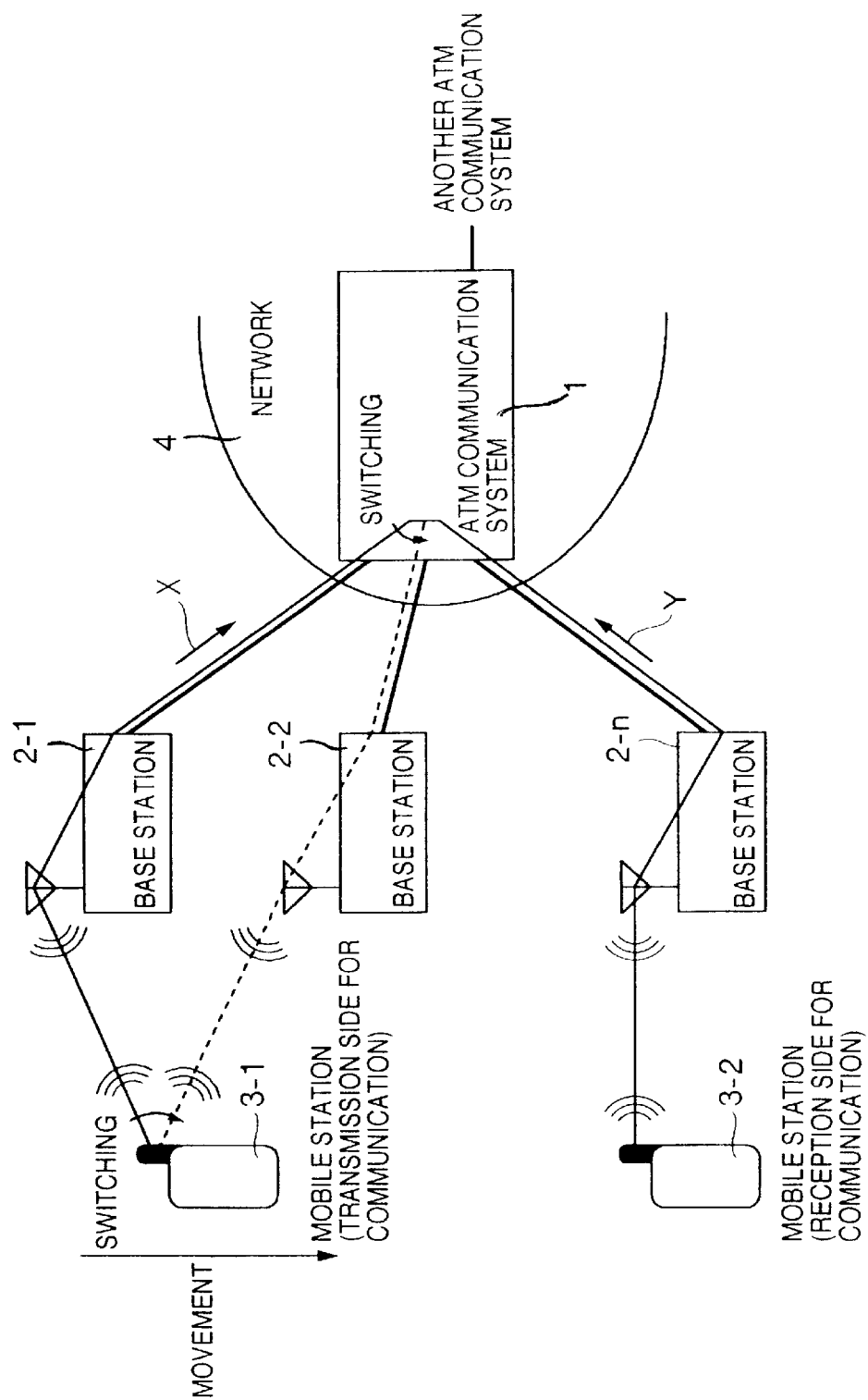

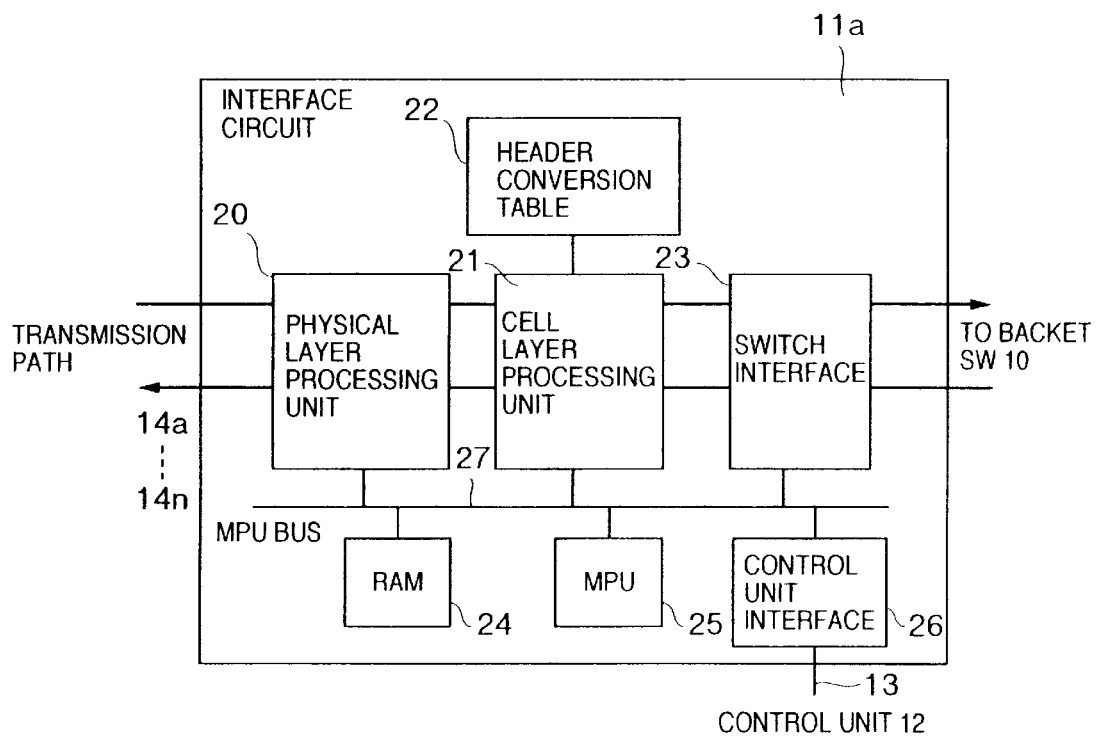

COMMUNICATION SYSTEM

This is a continuation of application Ser. No. 09/638,028, filed Aug. 15, 2000 now U.S. Pat. No. 6,289,008; which is a continuation of application Ser. No. 09/411,655, filed Oct. 4, 1999, now U.S. Pat. No. 6,178,165; which is a continuation of application Ser. No. 08/970,159, filed Nov. 13, 1997, now U.S. Pat. No. 6,049,534.

BACKGROUND OF THE INVENTION

The present invention relates in general to a communication system for carrying out a hand-over which is requested from a radio base station due to the movement of a mobile station, and more particularly to a packet communication system for managing packet signals and an Asynchronous Transfer Mode (ATM) system for managing cell signals.

In recent years, high reliability has been required for a public communication network for transmitting data relating to voice and images. Nowadays having entered the multimedia era, data is transmitted, for example, utilizing mobile communications. Hence for mobile communications, high reliability has been required when carrying out the hand-over of calls.

A discussion of the hand-over of call is provided, for example, by the reference "Mobile Communication Network, the 12th series of Information Network", by Mitsuo Yokoyama, Shokoudou.

SUMMARY OF THE INVENTION

In the light of the foregoing, it is an object of the present invention to provide a communication system which is capable of realizing hand-over of calls in such a way that during the hand-over resulting from the movement of a mobile station, interruption of communication does not occur.

It is another object of the present invention to provide a communication system which is capable of realizing hand-over in such a way that interruption of communication can be prevented from occurring only by adding a trunk function thereto without changing the circuit configuration of the existing communication system.

It is still another object of the present invention to provide a communication system which can be used as an Asynchronous Transfer Mode (ATM) exchange system for managing cell signals as well as a packet exchange system for managing packet signals.

In order to attain the above-mentioned objects, the present invention provides a communication system which includes a plurality of interface circuits through which communication signals are transmitted between a mobile station and a plurality of radio base stations via transmission paths. A switch is provided for assigning the communication signals to the interface circuits in such a way that the communication signals from the interface circuits are distributed in accordance with header information included in each communication signal indicating how the communication signal is to be transmitted from the radio base stations to the mobile station via the transmission paths. A control unit, connected to both the interface circuits and the switch, receives a hand-over instruction, which has been issued from the radio base station in accordance with the movement of the mobile station, from the associated interface circuit. A diversity hand-over processing unit, connected to both the control unit and the switch, receives both a first communication signal received from the radio base station, as a source of hand-over, which has output a hand-over instruction, and a second communication signal received from the radio base station as the destination of hand-over, which will be handed-over, in accordance with the hand-over instruction to output one of the first and second communication signals to the associated interface circuit. The diversity hand-over processing unit also transmits the communication signal which has been received from the mobile station on the reception side for communication via the radio base station to both the interface circuit associated with the radio base station as source of hand-over and the interface circuit associated with the radio base station as destination of hand-over.

The above-mentioned switch can be used in both an Asynchronous Transfer Mode (ATM) switch for managing cell signals and a packet switch for managing packet signals.

The above-mentioned diversity hand-over processing unit includes an instruction processing unit which operates in accordance with an instruction outputted from the control unit, a synchronous selection unit, and a signal duplicating unit.

The asynchronous selection unit receives, via the switch, when a service area is changed from the radio-base station as source of hand-over to the radio base station as destination of hand-over, both the communication signal from the interface circuit associated with the transmission path extending to the radio base station as source of hand-over and the communication signal from another interface circuit associated with the transmission path extending to the radio base station as destination of hand-over, in accordance with an instruction issued from the instruction processing unit. The synchronous selection unit also synchronizes both the two communication signals with each other, and outputs one of the two communication signals which is more excellent in quality to the interface circuit associated with the radio base station which communicates with the mobile station on the reception side for communication.

The signal duplicating unit receives a communication signal from the interface circuit associated with the transmission path extending to the radio base station which communicates with the mobile station on the reception side for communication via the switch, and transmits the communication signal thus received to both the interface circuit associated with the radio base station as a source of hand-over and the interface circuit associated with the radio base station as destination of hand-over. The signal duplicating unit also transmits the communication signal from the interface circuit associated with the radio base station which communicates with the mobile station on the reception-side for communication to the radio base station as destination of hand-over through that interface circuit.

The synchronous selection unit includes a first switch interface circuit for receiving, through an input port, both the communication signal from the radio base station as source of hand-over and the communication signal from the radio base station as destination of hand-over. A first selector is provided for receiving the communication signals to distribute, and in response to the communication signals, distributing these communication signals in accordance with the header information which the respective communication signals have, and a plurality of buffers are provided for temporarily storing both the communication signal from the radio base station as source of hand-over and the communication signal from the radio base station as destination of hand-over which communication signals have been outputted from the first selector. A synchronous circuit synchronizes the communication signals with each other which have been stored temporarily in the plurality of buffers. A selection circuit orders the respective communication signals in accordance with a predetermined algorithm. A header conversion circuit, having a header conversion table, converts the header conversion table, in accordance with the header information which the communication signals have, in such a way that the communication signals are directed from the switch to the mobile station on the reception side for communication through the interface circuit. A second selector selects among the communication signals from the header conversion circuit, and a second switch interface circuit outputs the communication signal from the second selector to the switch through an output port.

The signal duplicating unit includes a third switch interface circuit for receiving through an output port the communication signal output from the mobile station on the reception side for communication from the switch and a first signal processing unit, having a header conversion table, for changing the header conversion table in such a way that the communication signal of interest is directed to the radio base station as source of hand-over. A second signal processing unit, having a header conversion table, is provided for changing the header conversion table in such a way that the communication signal of interest is directed to the radio base station as destination of hand-over and first and second buffers are provided for temporarily storing the respective communication signals from the first and second signal processing units. A selector selects among the communication signals from the first and second buffers, and a fourth switch interface circuit outputs through an output port the communication signal from the selector to the switch.

By adopting the above-mentioned circuit configuration, during the hand-over, the diversity hand-over processing unit receives both the communication signals from the radio base station as source of hand-over and the radio base station as destination of hand-over which radio base stations are associated with the mobile station on the transmission side for communication, and then one of the two communication signals which is more excellent in quality is transmitted from the switch to the mobile station on the reception side for communication. In addition, the diversity hand-over processing unit transmits the communication signal from the mobile station on the reception side for communication to both the radio base station on the origin of hand-over and the radio base station on the destination of hand-over, and in accordance with the completion of the hand-over, the communication is established between the mobile station on the transmission side for communication and the mobile station which will receive the hand-over instruction and which will receive the communication signal. Therefore, during the hand-over, no interruption of the communication occurs at all.

BRIEF DESCRIPTION OF THE DRAWINGS

The above and other objects as well as advantages of the present invention will become clear by the following description of the preferred embodiments of the present invention with reference to the accompanying drawings, wherein:

FIG. 2 is a schematic view useful in explaining the relation among mobile stations, base stations and a communication system;

FIG. 3 is a block diagram useful in explaining configuration of an interface;

FIG. 4 is a schematic view showing a structure of header information;

DESCRIPTION OF THE PREFERRED EMBODIMENTS

The preferred embodiments of the present invention will hereinafter be described in detail with reference to the accompanying drawings.

Figure 1:
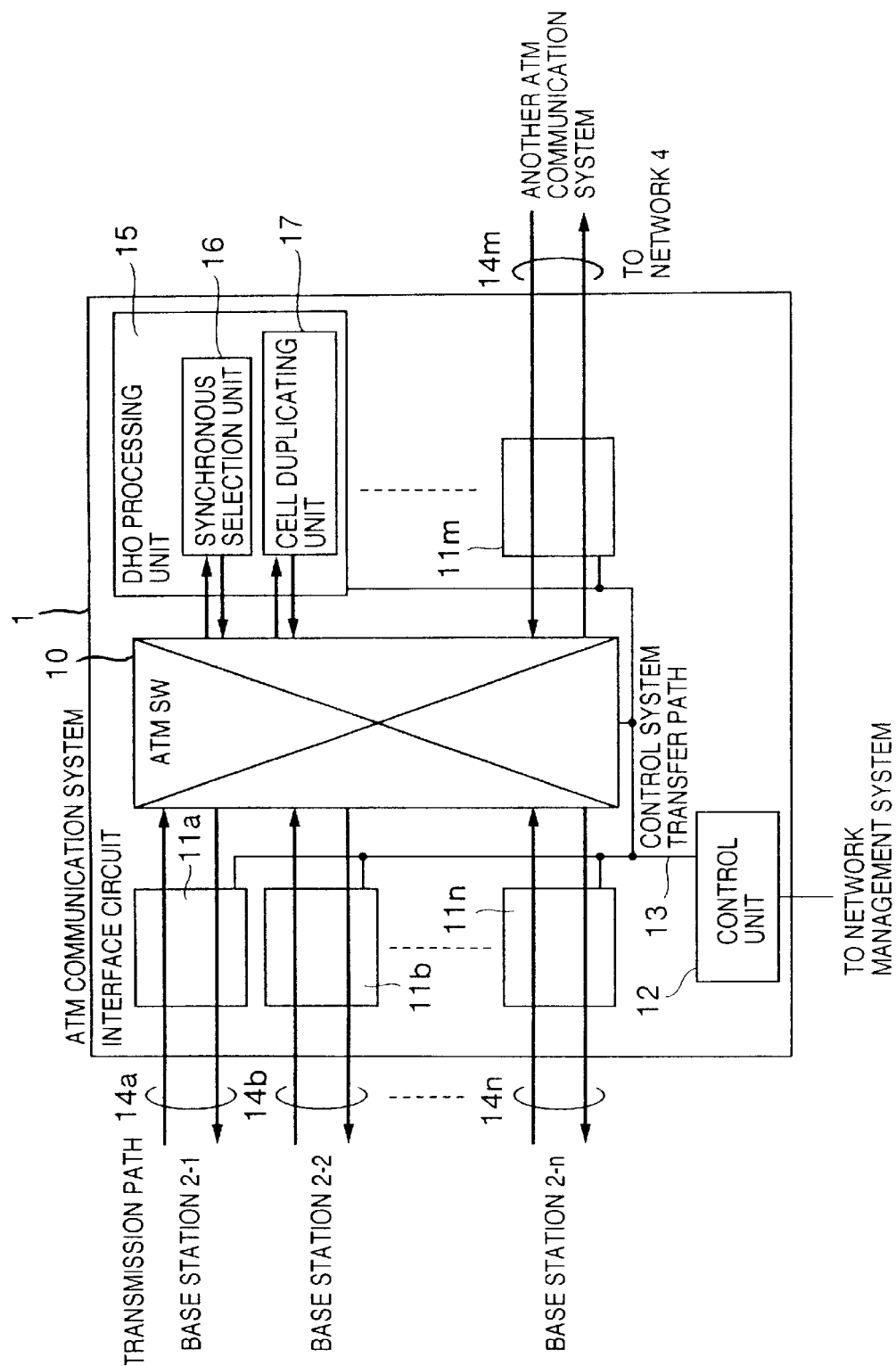
FIG. 1 is a block diagram showing a circuit configuration of one embodiment of a communication system according to the present invention.

FIG. 1 shows a configuration of an ATM communication system for use in realizing the diversity hand-over according to the present invention.

An ATM communication system 1 includes a plurality of interface circuits 11a to 11n through which the cells on transmission paths 14a to 14n are transmitted, an ATM switch 10 and a control unit 12, and also a diversity hand-over processing unit 15 is connected as a trunk to the ATM switch 10. This trunk is the well known general unit and is installed in the I/O (Input/Output) lines in order to carry out the monitor and control of the transmission paths. The diversity hand-over processing unit 15 includes: a synchronous selection unit 16 for carrying out, in the diversity hand-over, the selection between the cell coming from a base station 2-1 or a base station 2-2 as a source of hand-over, for example, from which the hand-over command has been outputted and the cell coming from a base station 2-n as a destination of hand-over which will receive the hand-over command, and also for transmitting the cell thus selected to the reception side for communication; and a cell duplicating unit 17 for distributing the cell coming from the reception side for communication between the base station 2-1 from which the hand-over command has been outputted and the base station 2-2 which will receive the hand-over command. An interface circuit 11m is connected to another ATM communication system which is connected to a network 4 (FIG. 2).

Now, the description will hereinbelow be given with respect to the general hand-over function with reference to FIG. 2. Firstly, a mobile station 3-1 on the transmission side for communication communicates with a mobile station 3-2 on the reception side for communication. The mobile station 3-1 is located within the service area of a base station 2-1, and hence the communication signal is transmitted to the network 4 through the base station 2-1. On the other hand, the mobile station 3-2 is located within the service area of a base station 2-n, and hence the communication signal is transmitted to the network 4 through the base station 2-n. Thus, the mobile station 3-2 communicates with the mobile station 3-1 through both the ATM communication system 1 and the base station 2-1. The cells from the base stations 2-1, . . . , 2-n are transmitted to the ATM communication system 1 which carries out the routing therefor. In FIG. 2, the cell which has reached the ATM communication system 1 from the mobile station 3-1 through the base station 2-1 is then transmitted so as to be directed to the mobile station 3-2 through the base station 2-n by the ATM communication system 1. In addition, conversely, the cell which has reached the ATM communication system 1 from the mobile station 3-2 through the base station 2-n is then transmitted so as to be directed to the mobile station 3-1 through the base station 2-1 by the ATM communication system.

If the mobile station 3-1 is moved, then the mobile station 3-1 leaves the service area of the base station 2-1 and then enters into the service area of the base station 2-2. At this time, the communication of the mobile station 3-1 is changed from the base station 2-1 to the base station 2-2 and the communication thereof continues through the base station 2-2. That is, in the ATM communication system 1, the communication path for the mobile station 3-1 is switched from the base station 2-1 to the base station 2-2. In such a way, the so-called hand-over is carried out.

Incidentally, by the source of hand-over is meant a hand-over that is generated with the mobile station 3-1 as a source when the mobile station 3-1 is moved to enter from the service area of the base station 2-1 into the service area of the base station 2-2. On the other hand, by the destination of hand-over is meant a hand-over that will be carried out from now on when the mobile station 3-1 is moved to enter into the service area of the base station 2-2.

Next, the description will hereinbelow be given with respect to the interface circuit 11a with reference to FIG. 3. Incidentally, each of other interface circuits 11b to 11n, 11m has also the same configuration as that of the interface circuit 11a. Cell coming over the transmission path 14a terminates in a physical layer at a physical layer processing unit 20 to be transmitted to a cell layer processing unit 21 which carries out the header conversion of the cell, i.e., changes the contents of a header conversion table 22 which the cell layer processing unit 21 has.

Now, the header conversion table 22 will hereinbelow be described with reference to FIG. 4. The header conversion table 22 consists of a reception side header 30, a header 31 within the unit and a transmission side header 32 which are set at every communication path. At the time when the cell has reached the interface circuit 11a shown in FIG. 3, the reception side header 30 which the coming cell has is duplicated in the reception side header 30, and on the basis of the reception side header 30, both the header 31 within the unit and the transmission side header 32 are produced to be applied to the coming cell.

The cell which has been subjected to the header conversion in such a way is then transmitted to the ATM switch 10 through a switch interface 23. On the other hand, the cell which has reached the interface circuit 11a from the ATM switch 10 is then transmitted to the cell layer processing unit 21 through the switch interface 23 to be transmitted from the physical layer processing unit 20 to the transmission path 14a. All the physical layer processing unit 20, the cell layer processing unit 21, the switch interface 23, a RAM 24 and a control unit interface 26 which are provided within the interface circuit 11a are connected to one another through an MPU bus 27, and also are controlled by an MPU 25 which is also connected to the MPU bus 27. The RAM 24 is a processing area of the MPU 25, and also the MPU 25 is connected to a control system transfer path 13 through the control unit interface 26 and is controlled by the control unit 12.

Figure 5:
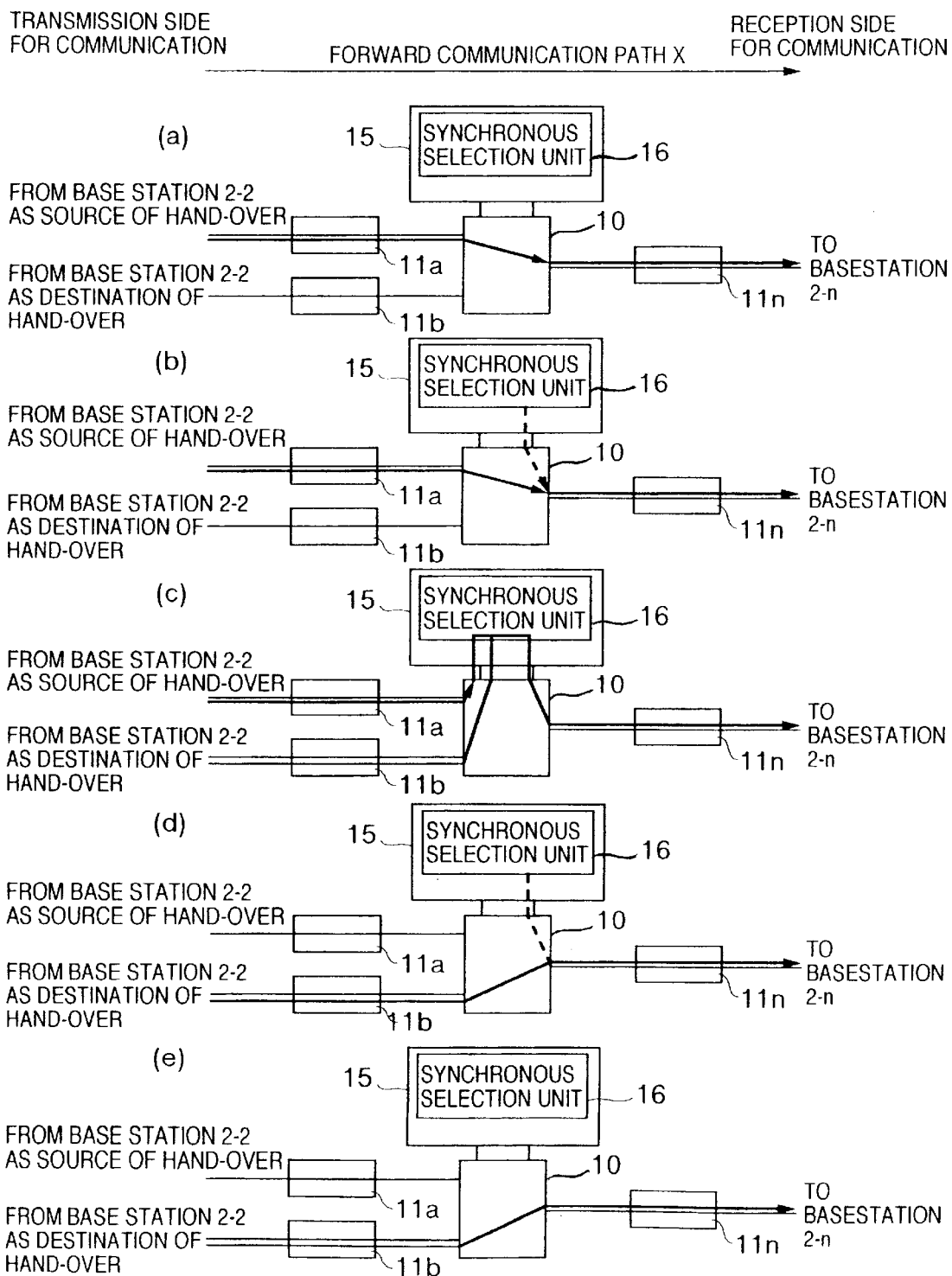
FIG. 5 is a schematic view useful in explaining the state from the transmission side for communication to the reception side for communication when carrying out the diversity hand-over of the present invention.

Next, the description will hereinbelow be given with respect to the operation of the ATM communication system 1 for carrying out the diversity hand-over with reference to FIG. 5. The description will hereinbelow be given with respect to the operation of the communication path extending from the mobile station 3-1 on the transmission side for communication up to the mobile station 3-2 on the reception side for communication through the base station 2-1, the ATM communication system 1 and the base station 2-n, with reference to FIG. 2. Incidentally, this communication path is referred as the forward communication path X, when applicable. In FIG. 5, an arrow indicated by a heavy line represents the flow of the cell, and an arrow indicated by a dotted line represents that the cell is in the state of being able to be transmitted.

A part (a) of FIG. 5 shows the state in which the mobile station 3-1 communicates with the mobile station 3-2 through the base station 2-1, the ATM communication system 1 and the base station 2-n. That is, there is shown the state in which the ATM switch 10 is switched in such a way that the cell from the base station 2-1 as a source of hand-over is transmitted to the base station 2-n through the interface circuit 11a, the ATM switch 10 and the interface circuit 11n.

In a part (b) of FIG. 5, when the mobile station 3-1 has been moved from the service area of the base station 2-1 to enter into the service area of the base station 2-2, if a request of the hand-over from the mobile station 3-1 is received by the ATM communication system 1 through the base station 2-1, then the contents of the header conversion table 22 which the interface circuit 11a connected to the base station 2-1 has are changed so that the cell from the interface circuit 11a is transmitted to the synchronous selection unit 16 (which will be described in detail later). In the synchronous selection unit 16, the contents of the header conversion table 22a which a header conversion circuit 50a (which will be described later) of the synchronous selection unit 16 has are changed so that the cell which has been received from the base station 2-1 as a source of hand-over can be transmitted to the interface circuit 11n. At this time, the cell is continuously transmitted from the interface circuit 11a connected to the base station 2-1 as a source of hand-over to the interface circuit 11n.

In a part (c) of FIG. 5, when the setting of the header conversion table 22a has been completed, since the mobile station 3-1 starts already entering into the service area of the base station 2-2, the contents of the header conversion table 22 of the interface circuit 11b having the connection relation with the base station 2-2 are changed, so that the cell from the interface circuit 11b is transmitted to the synchronous selection unit 16. In the synchronous selection unit 16, the contents of the header conversion table 22a which the header conversion circuit 50a has are changed so that the cell from the interface circuit 11b can be transmitted to the interface circuit 11n. In such a way, both the cell from the base station 2-1 as a source of hand-over and the cell from the base station 2-2 as a destination of hand-over are transmitted to the synchronous selection unit 16. In the synchronous selection unit 16, after the cell from the base station 2-1 as a source of hand-over has been synchronized with the cell from the base station 2-2 as a destination of hand-over, one of the two cells which has the higher reception sensitivity is selected.

In a part (d) of FIG. 5, the separation of the cell from the base station 2-1 as a source of hand-over is carried out. For this purpose, firstly, the communication path between the base station 2-1 as a source of hand-over and the ATM communication system 1 is interrupted. Then, the setting of the contents of the header conversion table 22 of the interface circuit 11b is changed so that the cell from the base station 2-2 as a destination of hand-over is transmitted to the base station 2-n on the reception side for communication through the interface circuit 11n. At this time, the setting of the contents of the header conversion table 22a of the synchronous selection unit 16 is left as it is.

In a part (e) of FIG. 5, the control unit 12 cancels the control by the diversity hand-over processing unit 15.

In such a way, in the forward communication path X, the hand-over is carried out without interrupting the communication established between the mobile station 3-1 on the transmission side for communication and the mobile station 3-2 on the reception side for communication.

Figure 6:
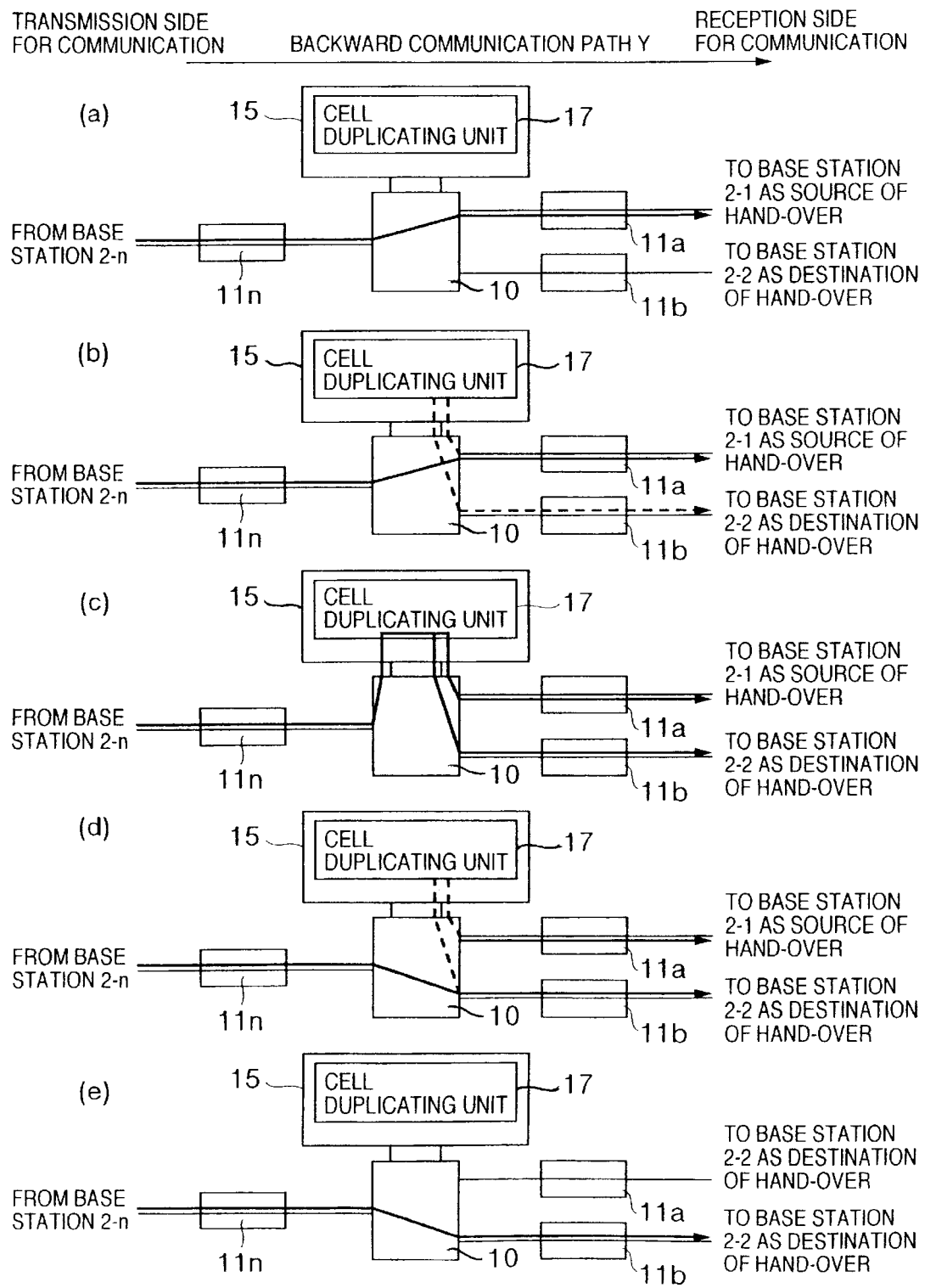
FIG. 6 is a schematic view useful in explaining the state from the reception side for communication to the transmission side for communication when carrying out the diversity hand-over of the present invention.

Next, the description will hereinbelow be given with respect to the operation, out of the execution of the diversity hand-over, of the communication path extending from the mobile station 3-2 on the reception side for communication to the mobile station 3-1 through the base station 2-n, the ATM communication system 1 and the base station 2-2. This communication path is referred as the backward communication path Y, when applicable. In FIG. 6, an arrow indicated by a heavy line represents the flow of the cell, and an arrow indicated by a dotted line represents that the cell is in the state of being able to be transmitted.

A part (a) of FIG. 6 shows the state in which the mobile station 3-2 communicates with the mobile station 3-1 through the base station 2-n, the ATM communication system 1 and the base station 2-1. That is, there is shown the state in which the ATM switch 10 is switched so that the cell from the base station 2-n on the reception side for communication is transmitted to the base station 2-1 through the interface circuit 11n and the ATM switch 10.

In a part (b) of FIG. 6, when the mobile station 3-1 has been moved from the service area of the base station 2-1 to enter into the service area of the base station 2-2, if the request of hand-over from the mobile station 3-1 is received by the ATM communication system 1 through the base station 2-1, then, firstly, in a cell duplicating unit 17 (which will be described in detail later) which the diversity hand-over processing unit 15 has, the contents of the header conversion table 22-1 which the cell duplicating unit 17 has are set on the basis of the reception side header 30 which the received cell has so that the cell which has been received from the base station 2-n on the reception side for communication can also be transmitted to the interface circuit 11b. At this time, the cell is continuously transmitted from the interface circuit 11n connected to the base station 2-n on the reception side for communication to the interface circuit 11a.

In a part (c) of FIG. 6, at the time when the contents of the header conversion table 22-1 of the cell duplicating unit 17 have been set, the cell is duplicated in the cell duplicating unit 17 and the resultant cells are respectively transmitted to the interface circuit 11a and the interface circuit 11b. That is, the so-called multicasting is carried out.

In a part (d) of FIG. 6, the contents of the header conversion table 22 of the interface circuit 11n are changed, so that the cell from the base station 2-n on the reception side for communication can be transmitted to the interface circuit 11b. As a result, the cell from the base station 2-n on the reception side for communication has been transmitted to the base station 2-2 as a destination of hand-over through the interface circuit 11b.

In a part (e) of FIG. 6, the control by the diversity hand-over processing unit 15 is canceled.

In such a way, in the backward communication path Y as well, the hand-over is carried out without interrupting the communication established between the mobile station 3-1 on the transmission side for communication and the mobile station 3-2 on the reception side for communication.

Figure 7:
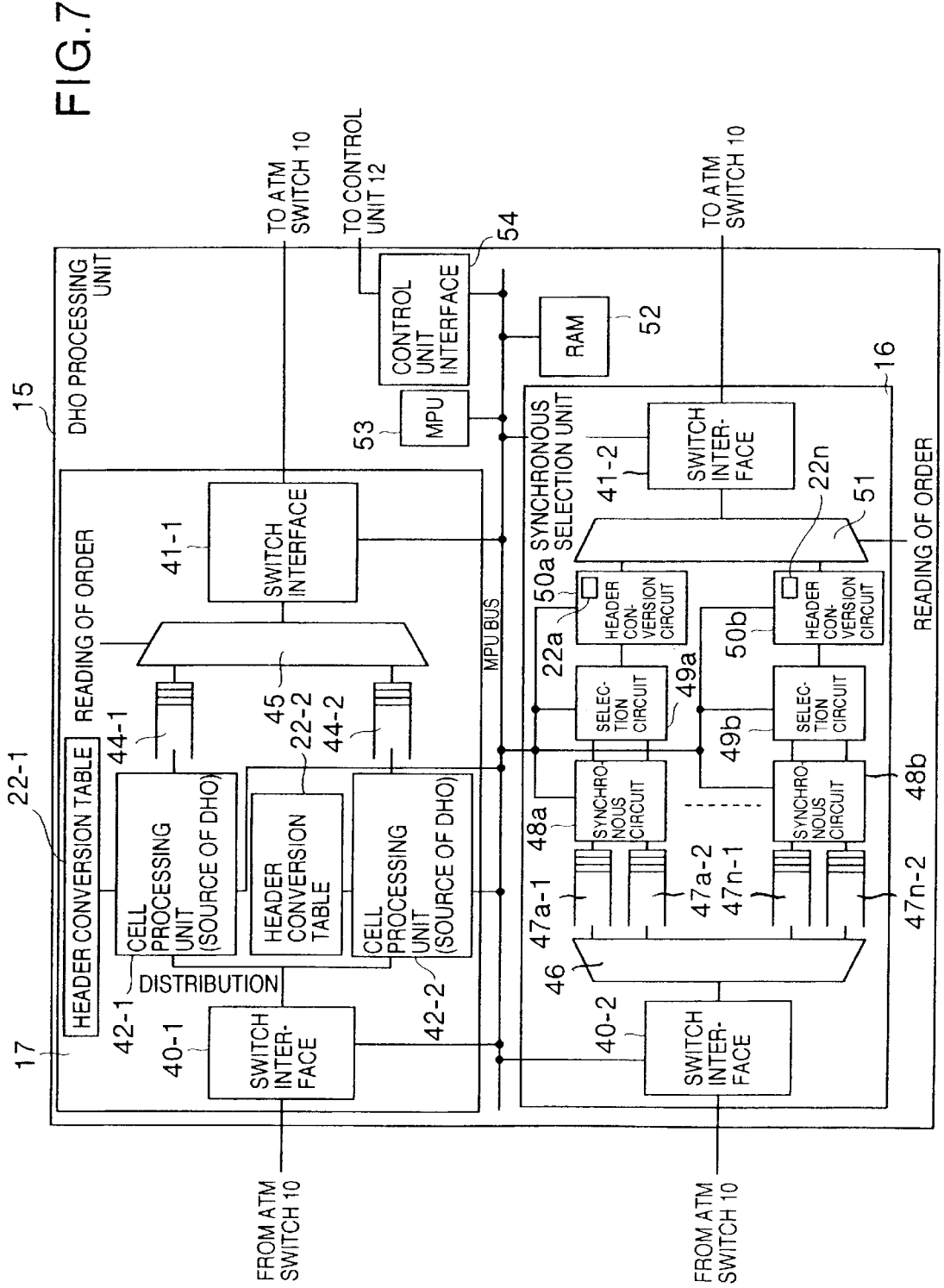
FIG. 7 is a block diagram showing a configuration of a diversity hand-over processing unit of the present invention.

FIG. 7 is a block diagram showing a configuration of the above-mentioned diversity hand-over processing unit 15. In the diversity hand-over processing unit 15, both the cell duplicating unit 17 and the synchronous selection unit 16 are connected to an MPU bus to which an MPU 53, a RAM 52 having the processing area of the MPU 53, and a control unit interface circuit 54 for use in the interface with the control unit 12 which the ATM communication system 1 has are further connected, so that the MPU 53 controls both the cell duplicating unit 17 and the synchronous selection unit 16 in accordance with the instruction outputted from the control unit 12.

The cell duplicating unit 17 has one input port and one output port for input/output of the cell to/from the ATM switch 10 and when the cell which has been transmitted by the mobile station 3-2 on the reception side for communication through the ATM switch 10 is received by a switch interface circuit 40-1 through the base station 2-n, distributes the cell thus received between a cell processing unit 42-1 and a cell processing unit 42-2. Incidentally, while in this example, the cell is distributed between the two cell processing units, in order to improve the processing efficiency, two or more cell processing units may be provided. In both the cell processing units 42-1 and 42-2, the contents of each of header conversion tables 43-1 and 43-2 are converted so that the state shown in the part (c) of FIG. 6 can be obtained, i.e., the cell is transmitted to both the interface circuits 11a and 11b. The contents of each of the header conversion tables 43-1 and 43-2 are the same as those shown in FIG. 4. The converted headers are given to the cell which are transmitted to buffers 44-1 and 44-2, respectively. A selector 45 reads out the cells from the buffers 44-1 and 44-2 and then transmits the cells thus read out to a switch interface circuit 41-1 to output the cells to the ATM switch 10.

The synchronous selection unit 16 has similarly to the cell duplicating unit 17, an input port and an output port for use in input/output of the cell to/from the ATM switch 10. At the time when the cell from the ATM switch 10 has been received by a switch interface circuit 40-2, a selector 46 transmits both the cell coming from the source of hand-over (the base station 2-1) and the cell coming from the destination of hand-over (the base station 2-2) to paired buffers 47a-1 and 47a-2. A synchronous circuit 48a compares the sequence numbers, which are shown in the respective headers of the cell from the source of hand-over and the cell from the destination of hand-over, with each other, and synchronizes both the cells to send the cells to a selection circuit 49a. The selection circuit 49a selects one of the cells in accordance with a predetermined algorithm and transmits the selected cell to a header conversion circuit 50a. The header conversion circuit 50a has a header conversion table 22a, the format of which is the same as that shown in FIG. 4. In the header conversion circuit 50a, the contents of the header conversion table 22a are changed so that the cell of interest can be directed to the interface circuit 11n associated with the mobile station 3-2 on the reception side for communication through the base station 2-n. In a selection 51, the scheduling is carried out so that the one of the two cells which is more excellent in quality is selected, and the selected cell is transmitted to the ATM switch 10 through the switch interface circuit 41-2. In such a way, if the instruction has been outputted from the control unit 12 to an MPU 53, then the MPU 53 carries out the above-mentioned control. Incidentally, as shown in FIG. 7, a plurality of paired buffers 47a-1 and 47a-2, 47n-1 and 47n-2, a plurality of synchronous circuits 48a, . . . , 48n, a plurality of selection circuits 49a, 10–49n, and a plurality of header conversion circuits 50a, . . . , 50n can be provided, which enables the processing efficiency to be improved.

Figure 8:
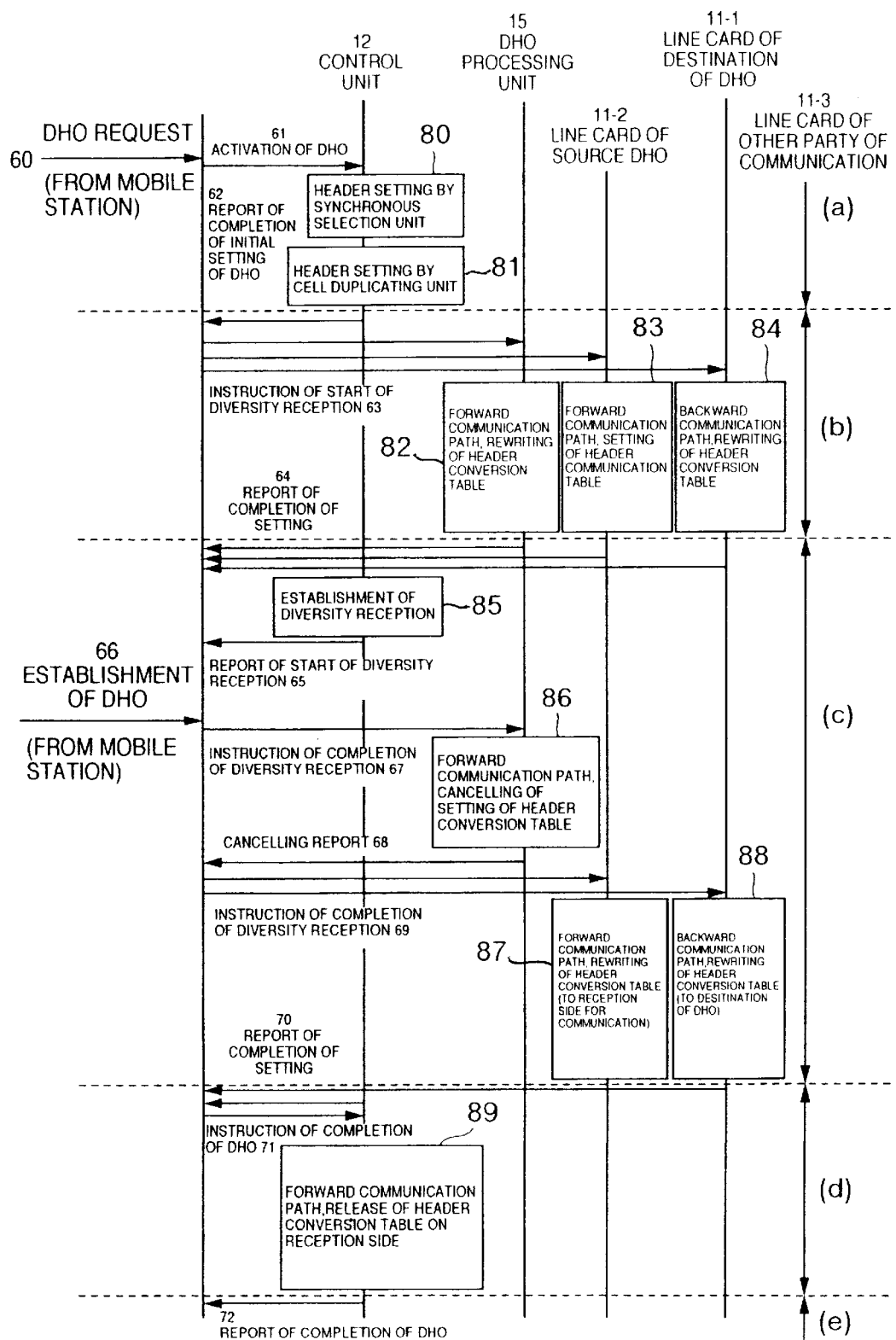
FIG. 8 is a flow chart showing the sequence of the diversity hand-over of the present invention.

FIG. 8 shows the sequences of the diversity hand-over processing which functions as a trunk. The sequences indicated by reference symbols (a) to (e) in FIG., 8 correspond to the parts (a) to (e) of FIG. 5 and FIG. 6. Firstly, a request of hand-over from the mobile station 3-1 is received by the control unit 12 of the ATM communication system 1 (Step 60). Then, the control unit 12 instructs the diversity hand-over processing unit 15 to activate the diversity hand-over (Step 61). The diversity hand-over processing unit 15 synchronizes both the cell coming from the source of hand-over and the cell coming from the destination of hand-over with each other, and then selects one of the cells in the synchronous selection unit 16 to carry out the header conversion (Step 80). At the same time, the cell duplicating unit 17 receives the cell from the reception side for communication through the base station 2-n, and then sets the header so that the cell is transmitted to both the interface circuits 11c having the connection relation with the source of hand-over and the interface circuit 11b having the connection relation with the destination of hand-over (Step 81). After completion of the setting of the header, the data relating to the setting completion is report ed t o the control unit (Step 62).

Next, the control unit 12 instructs the interface circuit 11a in the source of hand-over, the interface circuit 11b in the destination of hand-over and the interface circuit 11n on the reception side for communication. Then, in the interface circuits 11a and 11b, the setting of the contents of the header conversion tables 22 is changed so that the cell over the forward communication path X is transmitted to the diversity hand-over processing unit 15 (Step 82 and 83), and in the interface circuit 11n on the reception side for communication, the contents of the header conversion tables 22-1 and 22-2 are changed so that the cell over the backward communication path Y is transmitted to the diversity hand-over processing unit 15 (Step 84). The report of the completion of these processings is received by the control unit 12 (Step 64).

The diversity hand-over processing unit 15 stairs receiving the cell and carries out the synchronous processing with respect to the cell over the backward communication path Y so that the diversity reception of the cell is established (Step 85). When the processing becomes the diversity reception state of the cell, this is reported to the control unit 12 (Step 65).

When the report of establishment of the diversity reception of the cell has been received by the mobile station 3-1 (Step 66), firstly, the instruction of completion of the diversity reception of the cell is outputted to the interface circuit 11a as a source of hand-over (Step 67). Then, the interface circuit 11a cancels the setting of the header conversion table 22 for the forward communication path X (Step 86). Then, the canceling report is sent to the control unit (Step 68).

Next, the instruction of completion of the diversity reception is outputted to both the interface circuit 11b as a destination of hand-over and the interface circuit 11n on the reception side for communication (Step 69). The interface circuit 11b changes the contents of the header conversion table 22 for the cell over the forward communication path X so that the cell of interest is directed to the interface circuit 11n on the reception side for communication (Step 87). On the other hand, the interface circuit 11n changes the contents of the header conversion table 22 for the cell over the backward communication path Y so that the cell of interest is directed to the interface circuit 11b as a destination of hand-over (Step 88). As a result, the diversity transmission/reception of the cell has been completed. Thereafter, the completion report is sent to the control unit 12.

Finally, in order to release the diversity hand-over processing unit 15, the instruction of completion of the diversity hand-over is outputted to the 5 diversity hand-over processing unit 15 (Step 71). Then, the diversity hand-over processing unit 15 releases the header conversion table 22a for the forward communication path X, and the header conversion tables 22-1 and 22-2 for the backward communication path Y (Step 89). Then, the completion report is sent to the control unit 12 (Step 72). In such a way, the diversity hand-over has been completed.

Figure 9:
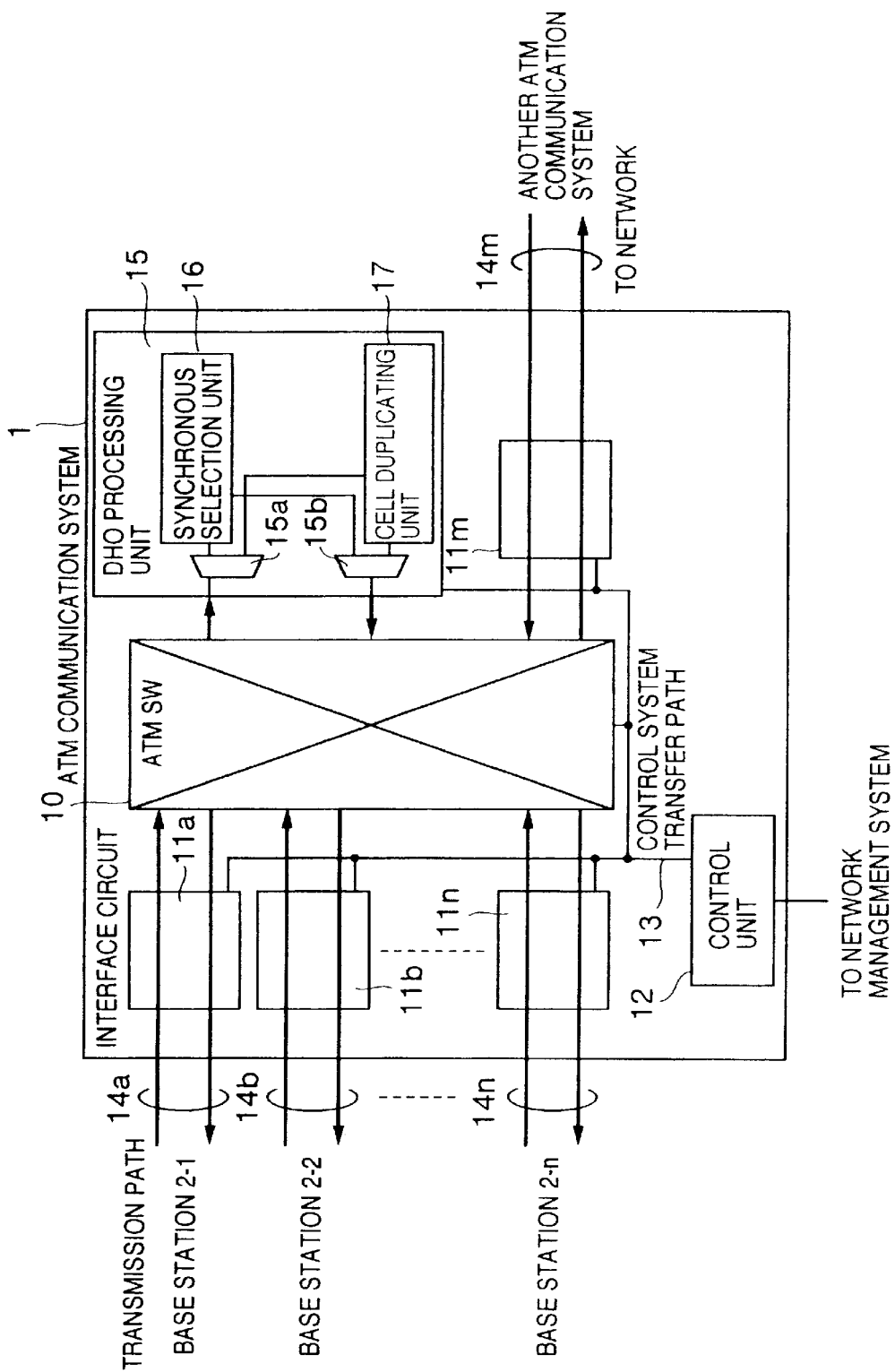
FIG. 9 is a block diagram showing a configuration of another diversity hand-over processing unit of the present invention.

FIG. 9 shows an example of other ATM communication system 1 including a diversity hand-over processing circuit 15. The feature of this diversity-hand-over processing circuit 15 is that the input ports between the synchronous selection unit 16 and the cell duplicating unit 17, and the ATM switch 10, and the output ports between the synchronous selection unit 16 and the cell duplicating unit 17, shown in FIG. 1, are arranged into one input port and one output port, respectively. For this reason, selectors 15a and 15b are respectively provided in the synchronous selection unit 16 and the cell duplicating unit 17 so that the cell output from the ATM switch 10 is supplied to the selector 15a from which the cell output is in turn supplied to both the synchronous selection unit 16 and the cell duplicating unit 17. In addition, the cell outputs from the synchronous selection unit 16 and the cell duplicating unit 17 are supplied to the selector 15b from which the cell is in turn supplied to the ATM switch 10. As a result, the number of ports is reduced.

In the case where as for the ATM switch 10, one having the multicasting function is employed, if the number of a plurality of cell processing units 42-1 and 42-2 as shown in FIG. 7 is further increased so as to match the number of channels of the multicasting function, then the switch interface circuit 40-1 becomes unnecessary, and hence the cell can be directly transmitted from the ATM switch 10 to the cell processing units.

While in the above-mentioned embodiments, the specific case where the ATM communication system 1 has only one diversity hand-over processing unit 15, has been described, it is to be understood that a plurality of diversity hand-over processing units may be provided in correspondence to the scale of the ATM communication system 1, and as a result the processing efficiency is improved.

In addition, while in the above-mentioned embodiments, the description has been given with respect to the specific case where the ATM communication system relays the cell, it should be noted that the ATM communication system 1 can be directly used as the packet communication system. In this case, the term "cells" which are given to the constituent elements in the description of the embodiments as well as in the drawings can be expressed in different term "packet".

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. A communication apparatus performing a diversity hand-over from a first radio base station to a second radio base station among a plurality of radio base stations when a radio terminal has moved from a first location to a second location, comprising:

a plurality of input and output ports;

a switch transferring communication signals from said plurality of input ports to at least one of said plurality of output ports in accordance with routing information included in the respective communication signals; and a diversity hand-over processing unit connected to a succeeding side of said switch and including control functions for receiving from a communication source both a first communication signal incoming from said radio terminal through said first radio base station and a second communication signal incoming from said radio terminal through said second radio base station and selecting one of said first and second communication signals to be transferred to a communication destination, and multicasting a communication signal incoming from the communication destination to said first radio base station and said second radio base station.

2. A communication apparatus according to claim 1, further comprising, a plurality of interface units performing transmission and reception of the communication signals between said plurality of radio base stations.

3. A communication apparatus according to claim 1, further comprising:

a plurality of interface units performing transmission and reception of the communication signals between said plurality of radio base stations, and between other communication apparatuses.

4. A communication apparatus according to claim 1, a plurality of said diversity hand-over processing units are connected to the succeeding side of said switch in parallel.

5. A communication apparatus performing a hand-over from a first radio base station to a second radio base station among a plurality of radio base stations when a radio terminal has moved from a first location to a second location, comprising:

a plurality of input and output ports;

a switch transferring communication signals from said plurality of input ports to at least one of said plurality of output ports in accordance with routing information included in the respective communication signals; and a hand-over processing unit connected to a succeeding side of said switch and including control functions for receiving from a communication source both a first communication signal incoming from said radio terminal through said first radio base station and a second communication signal incoming from said radio terminal through said second radio base station, synchronizing said first and second communication signals forming a synchronized communication signal and transferring said synchronized communication signal to a communication destination, and multicasting a communication signal incoming from the communication destination to said first radio base station and said second radio base station.

6. A communication apparatus according to claim 5, further comprising, a plurality of interface units performing transmission and reception of the communication signals between said plurality of radio base stations.

7. A communication apparatus according to claim 5, further comprising:

a plurality of interface units performing transmission and reception of the communication signals between said plurality of radio base stations, and between other communication apparatuses.

8. A communication apparatus according to claim 5, a plurality of said diversity hand-over processing units are connected to the succeeding side of said switch in parallel.

* * * * *